United States Patent Office 3,069,234
Patented Dec. 18, 1962

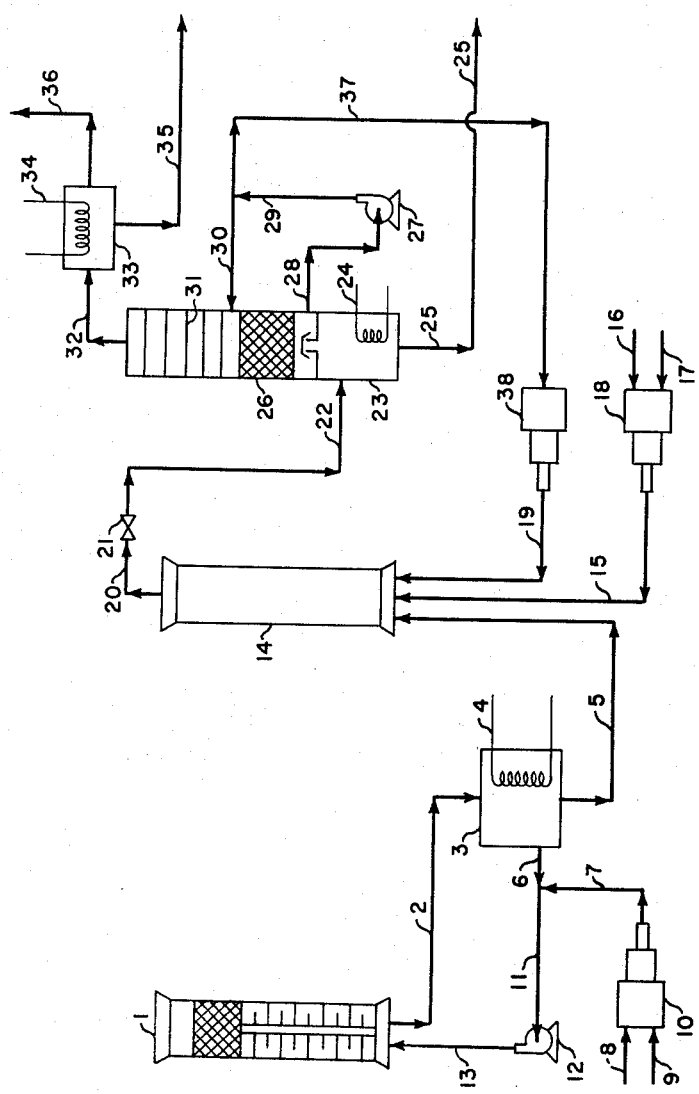

3,069,234
PROCESS FOR THE PRODUCTION OF AMMONIA AND PURIFICATION THEREOF BY UREA SYNTHESIS
Lucien H. Cook, Port Washington, N.Y., and Alexander J. Stewart, Oradell, N.J., assignors to Chemical Construction Corporation, New York, N.Y., a corporation of Delaware
Filed June 15, 1960, Ser. No. 36,382
3 Claims. (Cl. 23—199)

This invention relates to the combined production of urea and ammonia, by means of a process which achieves urea synthesis by conversion of a high pressure impure liquid ammonia stream derived directly from an ammonia synthesis loop. The process results in lowered overall equipment and operating costs, as well as providing a pure ammonia product stream as a by-product of the urea synthesis process.

The broad concept of combining high pressure ammonia synthesis with urea synthesis, so as to conserve or reduce compression power costs, has been advanced in such prior art as U.S. Patent No. 1,670,341 to Casale. However, this concept has never grown to commercial reality. Current practice basically consists of synthesizing ammonia at high pressure, usually about 5200 p.s.i.g., and then expanding the crude liquid ammonia stream to a storage pressure of about 75 p.s.i.g. The crude high pressure liquid stream contains impurities, principally dissolved hydrogen, nitrogen and argon, and the pressure reduction allows the removal of these dissolved impurities as an inert gas purge. Then pure liquid ammonia required for urea synthesis is pumped from 75 p.s.i.g. ammonia storage to the urea plant, and is subsequently recompressed to urea synthesis pressure of about 3500 p.s.i.g. and then passed into the urea synthesis autoclave for reaction with carbon dioxide to yield urea. It is evident that this sequence of steps is basically inefficient, since the ammonia is first expanded and then simply recompressed.

In the present invention, the ammonia and urea synthesis processes are combined in such a manner as to permit the direct utilization of the impure liquid ammonia at high pressure for urea synthesis. The high pressure liquid ammonia is passed directly from ammonia synthesis to urea synthesis, and is then reacted with a process stream consisting of carbon dioxide together with a gas containing free oxygen, preferably air. By this sequence of steps, it has been found possible to directly utilize the impure ammonia, since free hydrogen dissolved therein is presumably spontaneously eliminated by reaction with the free oxygen introduced in the carbon dioxide feed stream. The resulting water is of course readily assimilated in the process, and leaves the system in the aqueous product urea solution. The reaction mechanism of the hydrogen elimination has not been clearly defined, however, it appears that oxidation to water is the logical effect of free oxygen inclusion. In any case, the use of free oxygen together with carbon dioxide feed accomplishes the desired result, namely in that it permits the usage of impure ammonia direct from ammonia synthesis in the urea process.

The advantages of this process arrangement are manifold. Equipment and plant investment costs are reduced, since this process eliminates the liquid ammonia feed pumps, subcooler, and associated motors heretofore required in the urea plant. Additionally, the ammonia transfer pumps are eliminated from the ammonia plant. In general, piping and instrumentation of the overall facility are considerably reduced. Naturally overall erection costs and construction time for building the facility are also reduced.

Operating costs are reduced considerably, since power costs for recompressing the liquid ammonia to urea synthesis pressure are eliminated. Additional utility savings are gained since refrigeration power requirement for liquid ammonia subcooling is also eliminated. The general operating and maintenance labor costs of the plant are reduced since the amount of equipment present has been reduced, and also since the on-stream time of the urea plant is improved due to elimination of the high pressure liquid ammonia feed pumps which require relatively frequent repacking.

Another advantage of the process is that the urea facility may be utilized to purify all the ammonia produced at a larger ammonia plant, and thus yield a pure ammonia product stream. This advantage arises since, in general, urea synthesis is carried out using an excess of ammonia above the stoichiometric requirement. The excess ammonia is generally separated, recompressed, and recycled as pure ammonia for ultimate complete conversion to urea. In the process of the present invention, the entire impure output of an ammonia facility may be purified by passing the entire high pressure liquid ammonia stream to a urea plant in which only part of the ammonia is converted to urea. This provides several important advantages. Firstly, the hydrogen content of the ammonia stream is eliminated as water. Thus the volume of inerts to be purged is reduced. Second, the balance of inerts is eliminated in the urea processing units which are provided to recover pure ammonia from the urea synthesis effluent. Then the recovered pure ammonia is not recompressed and recycled, but instead is available as a pure ammonia product stream. Thus the combined ammonia-urea facility may be utilized to economically produce a pure ammonia product stream, in addition to producing urea in a more efficient manner by eliminating ammonia compression. A third advantage is gained if the urea facility handles a large excess of ammonia from a larger ammonia plant. As is known to those skilled in the art, the yield or percent conversion in urea synthesis is increased by providing a large excess of ammonia in the reactor feed. Thus by passing a large excess of high pressure impure liquid ammonia through the urea synthesis autoclave, the conversion or yield of urea is increased virtually free of charge since recompression and recycle of the excess ammonia is not required.

It is an object of the present invention to produce ammonia and urea in a combined process.

Another object is to combine ammonia and urea synthesis in a process which eliminates ammonia compression requirements.

A further object is to purify the impure liquid ammonia produced in ammonia synthesis, by combining this synthesis with a urea synthesis process.

An additional object is to eliminate dissolved hydrogen from the impure ammonia produced by ammonia synthesis from hydrogen and nitrogen.

Still another object is to combine the synthesis of ammonia and urea in an overall process with reduced equipment, utility and operating costs.

Still a further object is to directly utilize high pressure impure liquid ammonia produced by ammonia synthesis, in the synthesis of urea.

These and other objects and advantages of the present invention will become apparent from the description which follows. Referring to the FIGURE, ammonia is synthesized from hydrogen and nitrogen in catalytic converter 1, at an elevated pressure, usually between about 4000 p.s.i.g. to 6000 p.s.i.g. Ammonia converter 1 is shown only in schematic outline, details of a typical unit are presented in U.S. Patent No. 2,853,371. The effluent stream 2 from converter 1 consists of ammonia together with unconverted hydrogen and nitrogen plus inerts such as argon and methane. High pressure stream 2 is cooled in ammonia condenser 3, with cooling means shown in outline form only as coil 4. Ammonia is condensed in unit 3 as a liquid together with dissolved impurities including hydrogen, nitrogen, argon and methane. The impure liquid ammonia is withdrawn from vessel 3 via 5, while the residual gas stream is removed via 6 and combined with a mixed hydrogen-nitrogen makeup stream 7. Stream 7 is composed of hydrogen stream 8 and nitrogen stream 9. Streams 8 and 9 are produced by means of known processes, compressed to elevated pressure in compressor 10, and combined in stream 7 to provide a 3 to 1 molar ratio of hydrogen to nitrogen. The resulting overall combined gas stream 11 derived from streams 6 and 7 is now compressed in circulating compressor 12, and is fed via 13 to converter 1 for further ammonia synthesis.

Returning now to condenser 3, liquid ammonia stream 5 is withdrawn at an elevated pressure corresponding to the ammonia synthesis operating pressure, namely between about 4000 p.s.i.g. to 6000 p.s.i.g. Stream 5 is now passed directly into urea synthesis autoclave 14, with appropriate pressure reduction as necessary. Urea synthesis autoclave 14 is operated at elevated pressure, usually between about 2500 p.s.i.g. to 4500 p.s.i.g.

Mixed feed stream 15 is also passed into unit 14. Stream 15 consists primarily of carbon dioxide, together with a sufficiency of free oxygen to insure neutralization of free hydrogen contained in stream 5, presumably by oxidation. Stream 15 is produced by compressing carbon dioxide input stream 16 together with a gas stream 17, containing free oxygen, in compressor 18 to a pressure between about 2500 p.s.i.g. to 4500 p.s.i.g. Stream 17 usually consists of air, however, in some instances such as when hydrogen input stream 8 is produced by a hydrocarbon partial oxidation process, pure oxygen or oxygen-enriched air may be available. Naturally in such cases the available pure oxygen or oxygen-enriched air may be utilized in stream 17, to reduce the input volume of stream 17 and thereby reduce operating costs for compressor 18.

Recycle aqueous ammonium carbamate solution 19 is also shown passing into autoclave 14. Stream 19 is optional, and in some instances may be omitted, as will appear infra. In any case, urea synthesis takes place in autoclave 14, with product effluent stream 20 removed at high pressure, and passed through pressure reducing valve 21. The resulting stream 22, now at a pressure below about 400 p.s.i.g., is passed into purification means 23. Unit 23 is shown schematically as a single vessel, however, as will appear from copending U.S. patent applications Serial 6,644, filed February 4, 1960, and 5,379, filed January 29, 1960, the function and operation of unit 23 may take place in a plurality of vessels and process steps, at two distinct pressure levels. Thus unit 23 is only shown schematically to merely indicate its function in this preferred embodiment of the invention.

Stream 22 is heated by heating means 24 in unit 23, whereby ammonium carbamate decomposition and generation of a mixed ammonia-carbon dioxide off-gas takes place. As indicated supra, this process step may in fact take place in a plurality of stages, as described in the cited applications. The residual liquid phase is drawn off via 25 as an aqueous urea product solution. The rising off-gas stream passes through packed section 26 in unit 23, and is scrubbed and partially condensed by circulating aqueous ammonium carbamate solution which is drawn off via 28, discharged through pump 27 via 29 and partially recycled above the packed section 26 via 30 after cooling, not shown. The residual off-gas stream, now principally consisting of ammonia, is further purified in upper reflux section 31 of vessel 23, and finally an ammonia gas stream, free of carbon dioxide but containing inerts, is withdrawn via 32. Details of this purification process and apparatus are contained in the U.S. patent applications cited supra. The ammonia content of stream 32 is condensed to liquid in cooler 33 provided with cooling means 34, which may include refrigeration, not shown. Pure liquid ammonia product is withdrawn from condenser 33 via 35, while residual inerts are discharged via 36.

Returning now to the aqueous ammonium carbamate scrubbing stage in unit 23, only part of withdrawn stream 27 is returned to the vessel via 30. Pump discharge stream 29 is split, with the balance of stream 29 passing via 37 to recycle compressor 38. The aqueous ammonium carbamate solution is compressed to urea synthesis pressure between about 2500 p.s.i.g. to 4500 p.s.i.g. in compressor 38 and recycled via 19 to urea synthesis.

Other processes are available or will occur to those skilled in the art, regarding the processing of urea autoclave effluent stream 20. Thus in some instances an ammonia-consuming facility such as an ammonium nitrate plant may be utilized to recover ammonia values. In this case the processing of unit 23 and the recycle of stream 37 may be omitted, and instead a mixed ammonia-carbon dioxide gas may be produced by processing steps known to those skilled in the art, and utilized for ammonium nitrate production.

It should be noted that in instances such as utilization of mixed off-gas for ammonium nitrate manufacture, a pure ammonia product is not produced. However, the sequence of processing steps resulting in the production of pure ammonia is a preferred embodiment of the present invention, since it permits the urea process to be utilized as the purifying medium for a much larger ammonia facility. This concept was discussed supra in connection with the discussion of the advantages of the present invention. Where the ammonia facility is of considerably greater magnitude than the urea plant, so that molar ratios of ammonia to carbon dioxide of 5 to 1 or higher are feasible, the initial processing of the urea synthesis effluent may take place in a unit such as described in U.S. Patent Nos. 2,894,878 and 2,716,629, whereby a pure ammonia off-gas containing inerts is directly recovered from the effluent prior to ammonium carbamate decomposition. Similar and other processing alternatives will occur to those skilled in the art.

An example of industrial application of the present invention will now be described, to show the best mode of utilization of the process of the present invention.

*Example*

An impure liquid ammonia stream was produced by ammonia synthesis and passed to urea synthesis at 4000 p.s.i.g. and 70° F. Total feed rate was 14,920 pounds per hour. The stream analyzed as follows:

| Component | Weight percent | Equivalent feed rate, pounds per hour |
|---|---|---|
| Ammonia | 98.10 | 14,636 |
| Hydrogen | 0.17 | 25 |
| Nitrogen | 0.88 | 132 |
| Argon | 0.55 | 82 |
| Methane | 0.26 | 39 |
| Water | 0.04 | 6 |
| Total | 100.00 | 14,920 |

This entire stream was passed to a urea synthesis plant rated at 150 tons/day of urea, operating on a molar ammonia-carbon dioxide feed ratio of 3.5 to 1. The carbon dioxide was fed into the urea autoclave as a gas, together with 200 cubic feet per minute of air. The urea plant was a complete recycle unit, and thus produced a net liquid ammonia product stream consisting of 7400 pounds per hour of pure liquid ammonia at 250 p.s.i.g. and 110° F. Net product urea production was 12,750 pounds per hour.

This combined ammonia-urea plant showed considerable savings in equipment and operating costs, compared to conventional arrangements of the prior art. Thus the following major items of equipment were eliminated:

| Item | Net cost |
|---|---|
| Liquid Ammonia Feed Pump | $13,000 |
| Ammonia Subcooler | 2,200 |
| Ammonia Transfer Pump | 3,500 |
| Total | $18,700 |

In addition, other items of equipment including instrumentation, piping, electrical and structural accessories and field erection costs were eliminated. The total cost of these other items and charges aggregated $12,400, thus a total of $31,100 in capital costs was eliminated.

The saving in operating charges was also appreciable. Based on the elimination of a 180 H.P. drive for the liquid ammonia feed pump, 1500 g.p.m. of cooling water at 100° F. temperature rise, and 0.6 tons of refrigeration per ton of urea for ammonia subcooling, total electric power saving was $9600 per year. An additional saving in water charges amounted to $3140 year, to give a total reduction in operating utility charges of $12,740 per year.

We claim:

1. In an ammonia synthesis process in which nitrogen and hydrogen are catalytically reacted at elevated temperature and pressure to form ammonia, the resulting mixed gas stream is cooled at elevated pressure to condense crude liquid ammonia containing impurities comprising hydrogen, nitrogen and argon, and purified liquid ammonia product is recovered from said crude liquid ammonia at a reduced pressure, the improved method of removing said impurities which comprises reacting said crude liquid ammonia with carbon dioxide containing free oxygen at elevated pressure, whereby portions of said ammonia and carbon dioxide are combined to form urea and the oxygen combines with the hydrogen impurity to form water in a mixed process stream, removing excess free ammonia gas containing inerts from said mixed process stream, and condensing said ammonia gas to produce said purified liquid ammonia product.

2. In an ammonia synthesis process in which nitrogen and hydrogen are catalytically reacted at elevated temperature and pressure to form ammonia, the resulting mixed gas stream is cooled at elevated pressure to condense crude liquid ammonia containing impurities comprising hydrogen, nitrogen and argon, and purified liquid ammonia product is recovered from said crude liquid ammonia at a reduced pressure, the improved method of removing said impurities which comprises reacting said crude liquid ammonia product with carbon dioxide containing free oxygen and aqueous ammonium carbamate solution at elevated pressure, whereby a portion of said ammonia and carbon dioxide are combined to form urea and the oxygen combines with the hydrogen impurity to form water in a mixed process stream, heating the mixed process stream at reduced pressure, removing excess free ammonia gas containing inerts from said mixed process stream, condensing said ammonia gas to produce said purified liquid ammonia product, separating the residual process stream into product aqueous urea solution and aqueous ammonium carbamate solution, and compressing and recycling said aqueous ammonium carbamate solution.

3. In an ammonia synthesis process in which nitrogen and hydrogen are catalytically reacted at elevated temperature and a pressure in the range of 4000 p.s.i.g. to 6000 p.s.i.g. to form ammonia, the resulting mixed gas stream is cooled at elevated pressure to condense crude liquid ammonia containing impurities comprising hydrogen, nitrogen and argon, and purified liquid ammonia product is recovered from said crude liquid ammonia at a reduced pressure in the range of 75 p.s.i.g. to 400 p.s.i.g., the improved method of removing said impurities which comprises reacting said crude liquid ammonia with carbon dioxide containing air and aqueous ammonium carbamate solution at a pressure in the range of 2500 p.s.i.g. to 4500 p.s.i.g., whereby portions of said ammonia and carbon dioxide are combined to form urea and the oxygen combines with the hydrogen impurity to form water in a mixed process stream, reducing the pressure of the resulting mixed process stream below 4000 p.s.i.g., heating the mixed process stream to remove excess free ammonia and unconverted ammonium carbamate as a mixed ammonia-carbon dioxide gas stream from the residual process stream comprising product aqueous urea solution, contacting said mixed gas stream with a re-circulated aqueous ammonium carbamate solution whereby said carbon dioxide gas and part of said ammonia gas are re-condensed as ammonium carbamate and a final gas stream comprising ammonia and inerts is produced, condensing said final gas stream to produce said purified liquid ammonia product, compressing a portion of said aqueous ammonium carbamate solution, and recycling said compressed solution to said urea-forming reaction step.

References Cited in the file of this patent

UNITED STATES PATENTS

| | | |
|---|---|---|
| 1,670,341 | Casale | May 22, 1928 |
| 2,046,827 | Lawrence et al. | July 7, 1936 |